United States Patent
Alonso et al.

(10) Patent No.: US 12,430,016 B2
(45) Date of Patent: Sep. 30, 2025

(54) ADJUSTING AND/OR CUSTOMISING A USER INTERFACE OF A VEHICLE

(71) Applicant: Volvo Car Corporation, Gothenburg (SE)

(72) Inventors: Alvaro Rodrigo Alonso, Gothenburg (SE); Tor Guttormsen, Gothenburg (SE); Niclas Lind, Gothenburg (SE); Timur Kondrakov, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/732,794

(22) Filed: Apr. 29, 2022

(65) Prior Publication Data

US 2023/0350555 A1    Nov. 2, 2023

(51) Int. Cl.
| | | |
|---|---|---|
| *B60K 35/00* | (2024.01) | |
| *B60K 35/10* | (2024.01) | |
| *B60K 35/23* | (2024.01) | |
| *B60K 35/28* | (2024.01) | |
| *G06F 3/04847* | (2022.01) | |
| *G06F 9/451* | (2018.01) | |

(52) U.S. Cl.
CPC .......... *G06F 3/04847* (2013.01); *B60K 35/00* (2013.01); *G06F 9/451* (2018.02); *B60K 35/10* (2024.01); *B60K 35/23* (2024.01); *B60K 35/28* (2024.01); *B60K 2360/122* (2024.01); *B60K 2360/167* (2024.01)

(58) Field of Classification Search
None
See application file for complete search history.

(56) References Cited

U.S. PATENT DOCUMENTS

| | | | |
|---|---|---|---|
| 9,607,454 B1* | 3/2017 | Raghu | G08G 1/0112 |
| 10,056,008 B1* | 8/2018 | Sweany | G09B 19/167 |
| 2009/0222838 A1* | 9/2009 | Ho | G06F 16/9537 |
| | | | 719/314 |
| 2010/0277438 A1* | 11/2010 | Kawashima | B60K 35/00 |
| | | | 345/175 |
| 2012/0095643 A1* | 4/2012 | Bose | B60K 37/00 |
| | | | 715/744 |

(Continued)

OTHER PUBLICATIONS

Iglesias; Iñaki et al. Vehicle modelling for real time systems application. The virtual rolling chassis. Dyna (Bilbao). 88. 206-215. 10.6036/5177. (Year: 2013).*

(Continued)

*Primary Examiner* — Gabriel Mercado
(74) *Attorney, Agent, or Firm* — Clements Bernard Walker; Christopher L. Bernard

(57) ABSTRACT

A computer-implemented method for adjusting and/or customising a user interface of a vehicle including: providing, by the vehicle, user interface data of the vehicle to a separate computing unit, including at least information about the visualization parameters of at least one user interface; providing, by the computing unit, user interface control data for the at least one user interface based on the provided user interface data; transmitting the user interface control data to the vehicle; and adjusting and/or customising, by the vehicle, the at least one user interface based on the user interface control data in real time.

19 Claims, 4 Drawing Sheets

(56) References Cited

U.S. PATENT DOCUMENTS

| | | | | |
|---|---|---|---|---|
| 2015/0052447 | A1* | 2/2015 | Ritesh | H04L 67/125 |
| | | | | 715/740 |
| 2015/0070319 | A1* | 3/2015 | Pryor | H04N 7/183 |
| | | | | 345/175 |
| 2015/0202962 | A1* | 7/2015 | Habashima | B60K 37/06 |
| | | | | 345/633 |
| 2016/0291959 | A1* | 10/2016 | Searle | H04L 41/082 |
| 2017/0076395 | A1* | 3/2017 | Sedlik | G08G 1/012 |
| 2018/0115809 | A1* | 4/2018 | Camacho | H04Q 9/00 |
| 2018/0300680 | A1* | 10/2018 | Undernehr | G06Q 10/107 |
| 2020/0039558 | A1* | 2/2020 | Aerts | B62D 1/046 |
| 2020/0183558 | A1* | 6/2020 | Chen | H04L 67/535 |
| 2023/0134475 | A1* | 5/2023 | Prukop | G01C 21/3676 |
| | | | | 701/411 |

OTHER PUBLICATIONS

Dictionary.com, 2021, p. 3 (Year: 2021).*
WordHippo.com, 2021, pp. 1 and 5, (Year: 2021).*

* cited by examiner

ADJUSTING AND/OR CUSTOMISING A USER INTERFACE OF A VEHICLE

TECHNICAL FIELD

The present disclosure relates to a computer-implemented method for adjusting and/or customising a user interface of a vehicle, a system for adjusting and/or customising a user interface of the vehicle and a corresponding computer program element.

BACKGROUND ART

In the prior art, user interface systems, e.g. graphical user interface systems, are known for displays in vehicles, which, for example, provide a driver with information about the vehicle and/or the state of the vehicle, these user interface systems being created for a particular application and/or for a particular vehicle. Thereby, the user interface systems are individually tailored to the respective application with the respective functions, so that a reuse of certain functions, which are also used in other user interface systems, is generally not possible, so that an additional effort arises in the development of different user interface systems. Furthermore, adjustments and/or modifications of a function of a user interface system are also only possible with the revision of the entire user interface system, just as updating a function of a user interface system of a vehicle may only be performed as an overall update of the user interface system. Moreover, a user interface system may negatively affect the driving safety of a vehicle and/or trigger failures in the function of the vehicle. In addition, responding to user experience in terms of adjusting and/or customizing a feature is also only possible by updating the entire user interface systems.

In view of this, it is found that a further need exists to provide an improved method for adjusting and/or customising a user interface of a vehicle.

SUMMARY

In the view of the above, it is an object of the present disclosure to provide an improved method for adjusting and/or customising a user interface of a vehicle.

These and other objects, which become apparent upon reading the following description, are solved by the subject matter of the independent claims. The dependent claims refer to preferred examples of the disclosure.

According to a first aspect, a computer-implemented method for adjusting and/or customising a user interface of a vehicle is provided, including:
  providing, by the vehicle, user interface data of the vehicle to a separate computing unit, including at least information about the visualization parameters of at least one user interface;
  providing, by the computing unit, user interface control data for the at least one user interface based on the provided user interface data;
  transmitting the user interface control data to the vehicle; and
  adjusting and/or customising, by the vehicle, the at least one user interface based on the user interface control data in real time.

In other words, the computer-implemented method may be a prototyping platform that supports complex, rapid ideation and/or implementation of user interfaces in terms of human-centric design for a road-legal test fleet. In this context, vehicle functions may be read and written from vehicle signals in real time to meet the specific requirements of user interfaces, e.g., different prototypes of a user interface. Thereby, a prototype of a user interface for driving a vehicle, testing a vehicle and/or for presentation purposes for meetings may be created. However, the present disclosure is not limited to such prototyping platform.

The prototyping platform may include a complete tech stack or technical package that may be modular, with each module operating independently and interchangeable to adapt to the specific needs of a prototype.

Therefore, the prototyping platform may provide a common and reusable toolset for prototyping user experience in prototypes for user interfaces, which may improve the process of creating user interfaces for vehicle regarding the needed time and resources, by having to re-implement core functionality needed for each prototype of a user interface. In other words, the prototyping platform may provide a common set of user-friendly tools, both in terms of hardware and software implementation, to reduce the effort required to explore new technologies and ideas that may be tested in a vehicle, to be able to reduce development costs and improve the driver experience of a vehicle.

In an implementation, the computer-implemented method may include: providing, by the vehicle, vehicle data, which may include information about vehicle parameters and providing, by the computing unit, user interface control data for the at least one user interface, which may be further based on the provided vehicle data.

The vehicle data may be provided, for example, by a control unit of the vehicle, with the user interface accessing and/or displaying the vehicle data.

The control data for the user interface may be provided separately to the vehicle, for example, by a system.

In an implementation, the user interface control data may include information about a selection of vehicle parameters for displaying by the at least one user interface.

The vehicle parameters displayed may vary depending on the application, vehicle type, user interface type, prototype of a user interface, etc.

In an implementation, the vehicle data may include a vehicle speed of the vehicle, a vehicle gear level of the vehicle, a vehicle fuel range of the vehicle, a GPS location of the vehicle and/or further vehicle parameters. However, other data, e.g., weather data, may also be used/displayed.

Additional signals or data used and/or generated in a vehicle may also be displayed.

In an implementation, the vehicle data may be provided by the vehicle, e.g. by vehicle bus systems, preferably by a Flexray bus system, Controller Area Network bus system, CAN, Local Interconnect Network bus system, LIN, and/or automotive Ethernet bus system.

In addition, the vehicle data of various vehicle buses used in a vehicle may be provided.

In an implementation, the user interface may be configured to process web technology, in particular HTML data, CSS data and/or JavaScript data.

In this context, the user interface may include one or more elements that use web technologies for enabling fast iteration, deployment and reuse. In other words, making a new user interface, e.g. a prototype user interface, for a vehicle may become as simple as making a website.

Thereby, the user interface or prototype user interfaces of vehicles for driving, testing, or presenting may be in the state of being displayed as a web page as in the world wide web or documents and data in a web browser or internet browser in general.

In an implementation request data, e.g. a request of a driver, may be provided, whereby the user interface control data may then be further based on the request data.

The request data, which may be a vehicle parameter and/or user interface control data may be distinct from a driver's requirement for the vehicle.

In an implementation, the user interface may be an augmented reality user interface of the vehicle, a head-up display interface of the vehicle and/or a cockpit display interface of the vehicle.

In other words, this prototyping platform may provide flexibility to use existing vehicle features, integrate new technologies, and perform user testing in road environments of a vehicle. In addition, user interface prototypes developed with this platform may also be used in AR/VR environments or as showcase content during design reviews.

In an implementation, the vehicle may be provided by means of a vehicle software model.

In an implementation, the method may be performed as virtual reality model based on simulated vehicle data.

In an implementation, real-time may be defined in a timeframe of 10 milliseconds (ms) to 1000 ms, preferably between 50 ms and 300 ms and most preferably about 100 ms.

A further aspect of the present discourse relates to a system for adjusting and/or customising a user interface of a vehicle including:
- a first providing unit of the vehicle configured to provide user interface data of the vehicle to a separate computing unit, including at least information about the visualization parameters of at least one user interface;
- a second providing unit of a computing unit configured to provide user interface control data for the at least one user interface based on the provided user interface data;
- a transmitting unit configured to transmit the user interface control data to the vehicle; and
- an adjusting and/or customising unit of the vehicle configured to adjust and/or customise the at least one user interface based on the user interface control data in real time.

In an implementation, the system may include:
- a gateway unit;
- a message broker unit;
- a custom logic unit;
- a remote control unit; and/or
- a human machine interface (HMI) unit.

The gateway unit may be an interface to read and/or write vehicle buses.

The message broker unit may be a central hub to pass along messages of the system, in particular the control module, on request, for example, as pub/sub architecture. Therefore, the message broker unit decouples the units of the system, in particular, the control module.

The custom logic unit may be a middleware to enable stream signal processing. In computer science, middleware refers to application-neutral programs that mediate between applications in such a way that the complexity of these applications and their infrastructure are hidden.

The remote control unit may be an interface for subscribing and publishing both vehicle data and user interface data.

The HMI unit may be user-facing elements that affords communication and interaction, e.g. output/input for the driver of the vehicle.

A further aspect of the present discourse relates to a vehicle and/or computing unit configured to perform the herein disclosed method.

A further aspect of the present discourse relates to a computer program element with instructions, which, when executed on a computing device of a computing environment, is configured to carry out the steps of the disclosed method in the disclosed system.

BRIEF DESCRIPTION OF THE DRAWINGS

In the following, the disclosure is described exemplarily with reference to the enclosed figures, in which.

Notably, the figures are merely schematic representations and serve only to illustrate examples of the present disclosure. Identical or equivalent elements are in principle provided with the same reference signs.

DETAILED DESCRIPTION

Figure 1:
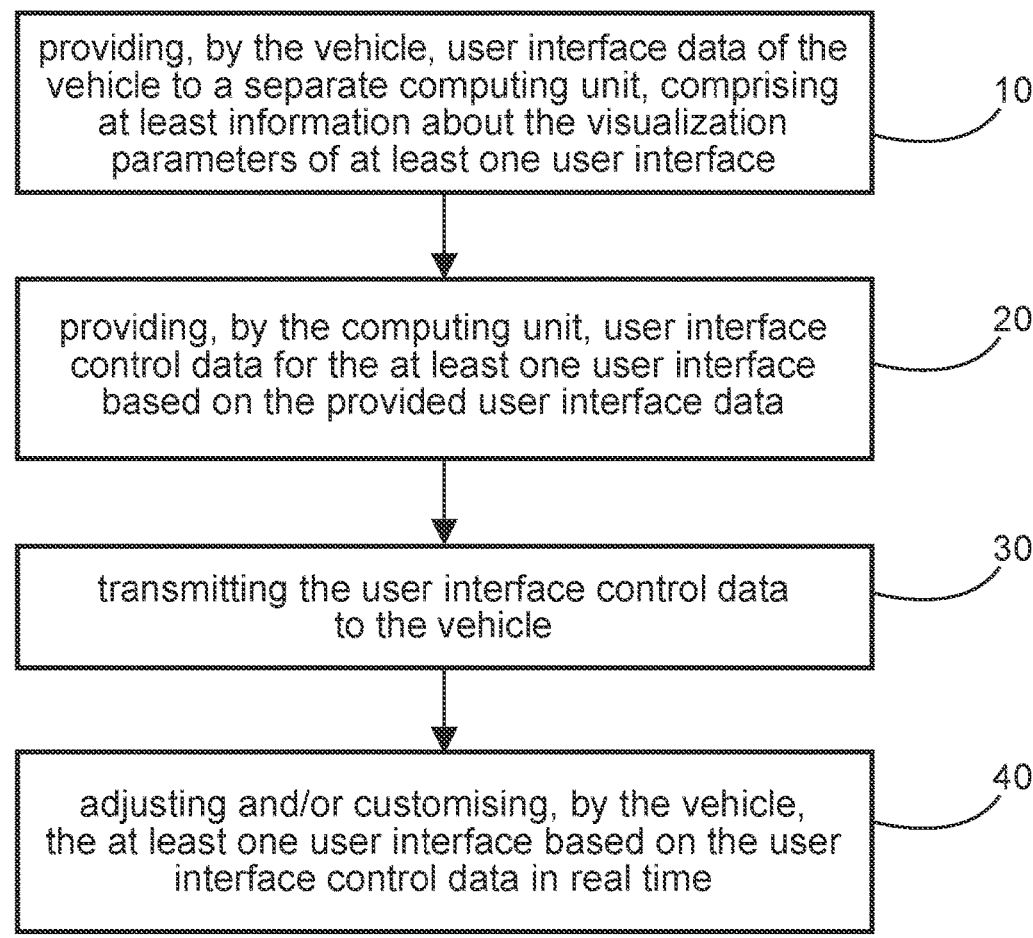
FIG. 1 is a schematic diagram of an example of a process of the disclosed method.

FIG. 1 shows a schematic diagram of a process of the disclosed method, whereby the method includes the steps of providing, by the vehicle, user interface data 10 of the vehicle to a separate computing unit, including at least information about the visualization parameters of at least one user interface. Further, a providing, by the computing unit, user interface control data 20 for the at least one user interface based on the provided user interface data. Further, a transmitting the user interface control data 30 to the vehicle. Further, an adjusting and/or a customising, by the vehicle, the at least one user interface 40 based on the user interface control data in real time.

Figure 2:
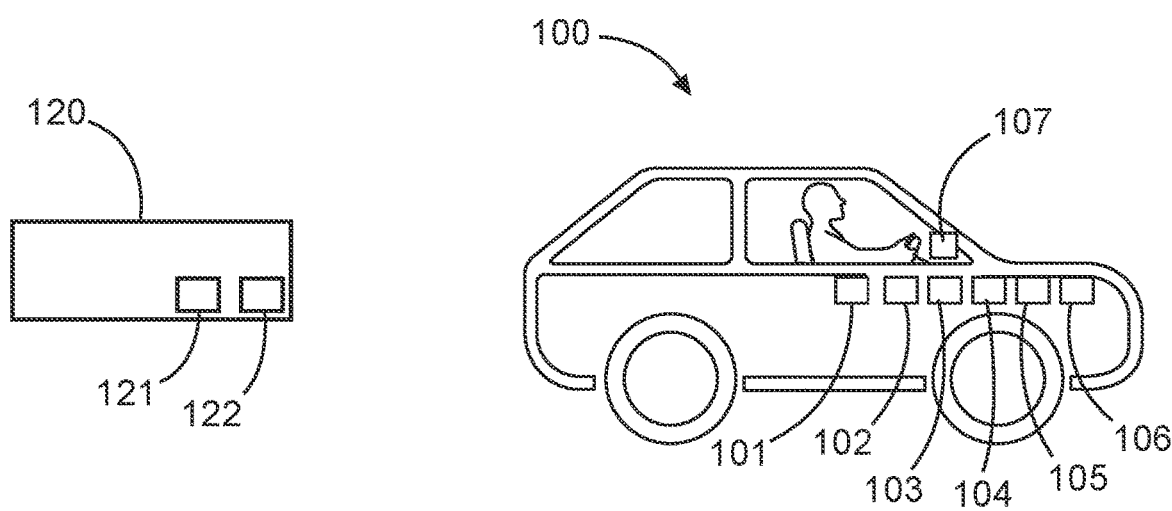
FIG. 2 is a schematic illustration of an example of a vehicle with the disclosed system.

FIG. 2 shows a schematic illustration of an example of a system for adjusting and/or customising a user interface of a vehicle 100 including different units.

A first providing unit 101 of the vehicle configured to provide user interface data of the vehicle to a separate computing unit 120, including at least information about the visualization parameters of at least one user interface, e.g., a cockpit user interface of the vehicle 100. The user interface data of the vehicle may be provided to the computing unit 120 by any wireless communication method, e.g. any wireless communication technology, like a mobile communication, a Bluetooth communication, etc. In a further use case, the user interface data of the vehicle 100 may be provided to the computing unit 120 by any wire based communication standard, for example, a smart grid communication for electric vehicles during charging the electric vehicle or by means of a wired control device.

A second providing unit 121 of the computing unit 120 configured to provide user interface control data for the at least one user interface based on the provided user interface data.

A transmitting unit 122 configured to transmit the user interface control data to the vehicle 100. In addition, here, the above-mentioned communication methods may be applied/used.

An adjusting and/or customising unit 102 of the vehicle 100 configured to adjust and/or customise the at least one user interface based on the user interface control data in real time.

Further, a gateway unit 103, a message broker unit 104, a custom logic unit 105, a remote control unit 106 and a HMI unit 107 are provided in the shown example. Whereby, the HMI unit 107 is configured to display the user interface.

Figure 3:
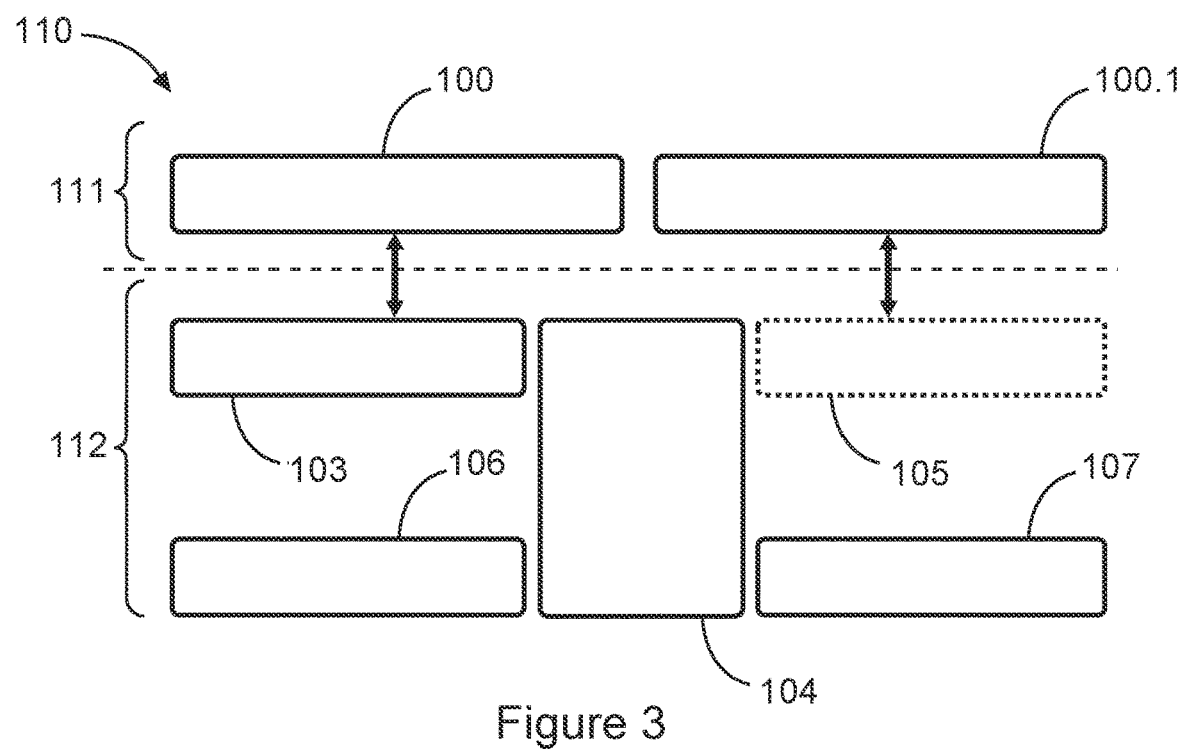
FIG. 3 is a schematic illustration of an example architecture of the disclosed method and system.

FIG. 3 shows a schematic illustration of an example architecture of a method and a system 110, including a vehicle 100, a (prototype) database and/or a software (prototype) tool 110.1 of the system 110, a gateway unit 103, a message broker unit 104, a custom logic unit 105, a remote control unit 106 and a HMI unit 107. Whereby the (prototype) database and/or software (prototype) tool 110.1 may include additional devices that may be included in the user interface setup and provide, for example, a configuration of buttons and/or new buttons for a steering wheel of a vehicle. Furthermore, the (prototype) database and/or software (prototype) tool 110.1 may simulate an environment for augmented reality and/or virtual reality.

The vehicle 100 and the database 110.1 aggregated as a first stage 111 and the gateway unit 103, the message broker unit 104, the custom logic unit 105, the remote control unit 106 and the HMI unit 107 aggregated as a second stage 112. Whereby the first stage 111 and the second stage 112 are configured to communicate in a bidirectional way with each other. Moreover, the first stage 111 and/or the second stage 112 may be further configured to communication with further units/entities, e.g. server systems. Further, the first stage 111 provides data to the second stage 112 and the second stage 112 process the provided data.

In other words, data is received by the vehicle 100, whereby, the custom logic unit 105 receives a list of signals of the vehicle 100 requested by the remote control unit 106 and the HMI unit 107. The gateway unit 103 reads the signals from the vehicle busses, e.g. Flexray, CAN, LIN and/or automotive Ethernet, in real time. Whereby the gateway unit 103 decodes the requested signals of the vehicle to human readable values and passes them to the custom logic unit 105. The custom logic unit 105 allows combining, process or simply passing through the incoming data, as needed. Further, the custom logic unit 105 publishes the data to the message broker unit 104 as requested. The HMI unit 107 displays the received data, for example, vehicle speed, gear, fuel range and/or GPS of the vehicle 100.

Further, data is received by the database 110.1, whereby the database 110.1 publish the data to the message broker unit 104. The custom logic unit 105 combines and/or process the data of the database 110.1, as needed. Further, the custom logic unit 105 publishes the data to the message broker unit 104. The HMI unit 107 displays the received data for example turn-by-turn indications and/or steering wheel button inputs.

Further, data is received by the remote control unit 106, whereby the remote control unit 106 publishes the data to the message broker unit 104. The custom logic unit 105 combines and/or processes the data of the remote control unit 106, as needed. Further, the custom logic unit 105 publishes the data to the message broker unit 104. The HMI unit 107 displays the received data, for example, notifications and/or user interface context changes.

Further, data is send to the vehicle 100, whereby received data being sent via the remote control unit 106 and/or database 110.1 from the custom logic unit 105 via the message broker unit 104 to the vehicle 100.

For example, a set of steering wheel buttons may be send to the vehicle, which should be pressed to activate a vehicle function. The request is received by the custom logic unit 105. The custom logic unit 105 translates the request to a vehicle readable format: a set of vehicle signals that will activate the vehicle function. This set of signals are injected into the vehicle's busses by the gateway unit 103.

Figure 4:
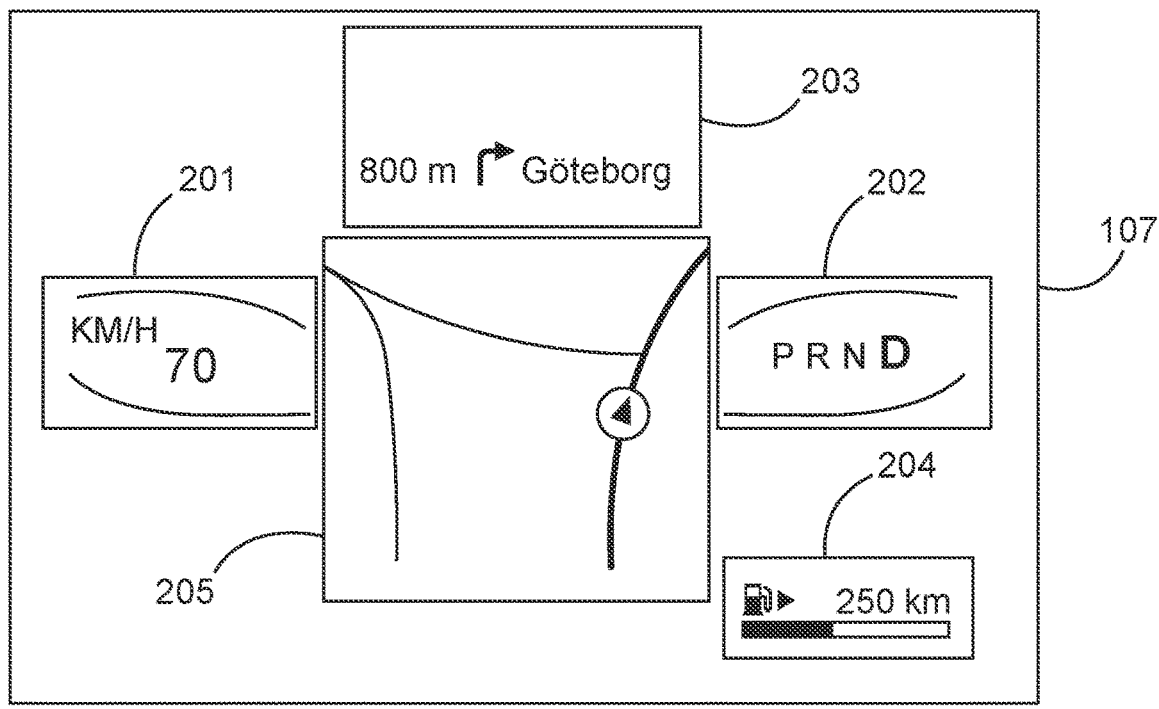
FIG. 4 is a schematic illustration of a first example of a user interface of a vehicle with the disclosed system and disclosed method.

FIG. 4 shows a schematic illustration of a first example of a user interface on a HMI unit 107 of a vehicle. The user interface include at least a first field 201, a second field 202, third field 203, fourth field 204 and a fifth field 205.

Further, in the first field 201, the user interface shows a first field view of a speed of the vehicle including the actual speed and the unit of the speed.

Further, in the second field 202, the user interface shows a first field view of a used gear of a transmission of the vehicle, including the possible gears of the transmission and a highlighting of the used gear.

Further, in the third field 203, the user interface shows a first field view of navigation instructions for reaching a desired destination that includes a distance for the next change of direction, a direction for the change of direction, and a location that will be reached next.

Further, in the fourth field 204, the user interface shows a remaining range of the vehicle, for example, based on the remaining fuel and/or charge of a battery of the vehicle.

Further, in the fifth field 205, the user interface shows a map of the location of the vehicle with an indication of a driving direction of the vehicle.

Figure 5:
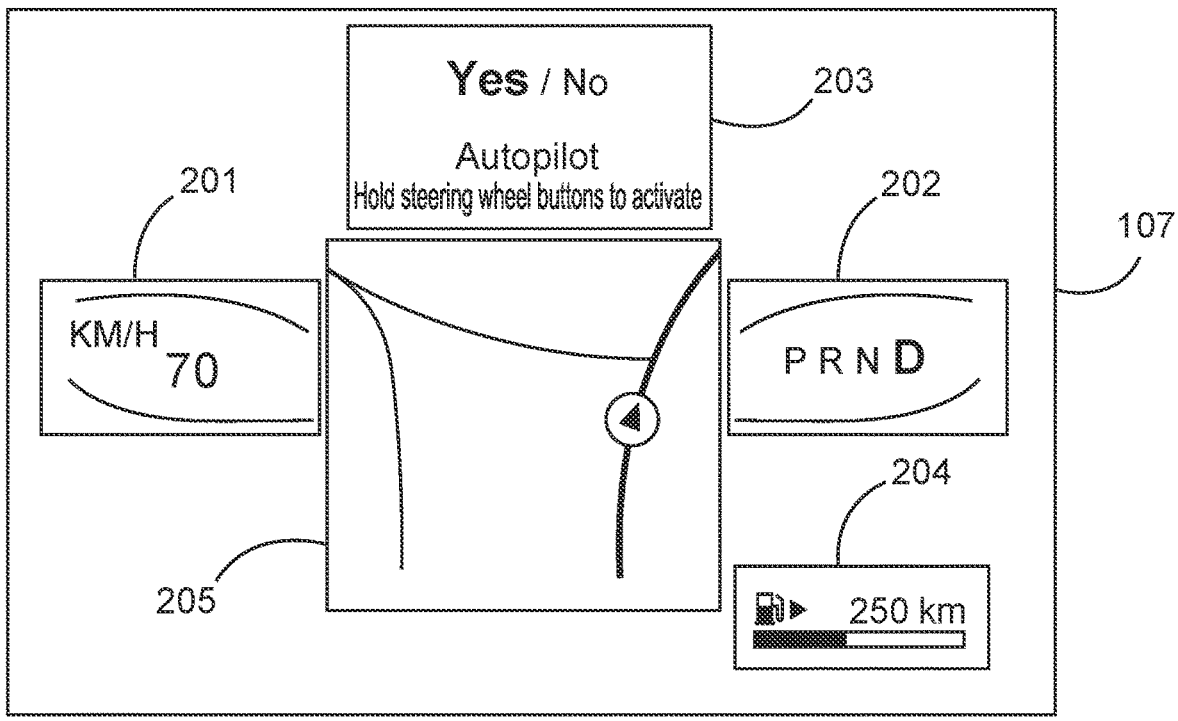
FIG. 5 is a schematic illustration of a second example of a user interface of a vehicle with the disclosed system and disclosed method.

FIG. 5 shows a schematic illustration of a second example of a user interface on a HMI unit 107 similar to FIG. 4. Whereby, here, in the third field 203, the user interface shows a second field view of autopilot information for the usage of the vehicle. Moreover, the steering wheel buttons are configured or reconfigured to activate an autopilot mode of the vehicle. It is further displayed in the third field 203 that a driver may activate the autopilot by holding the steering wheel buttons, i.e. the HMI unit 107 displays a notification on the availability of a specific vehicle function, here an autopilot function of the vehicle.

Figure 6:
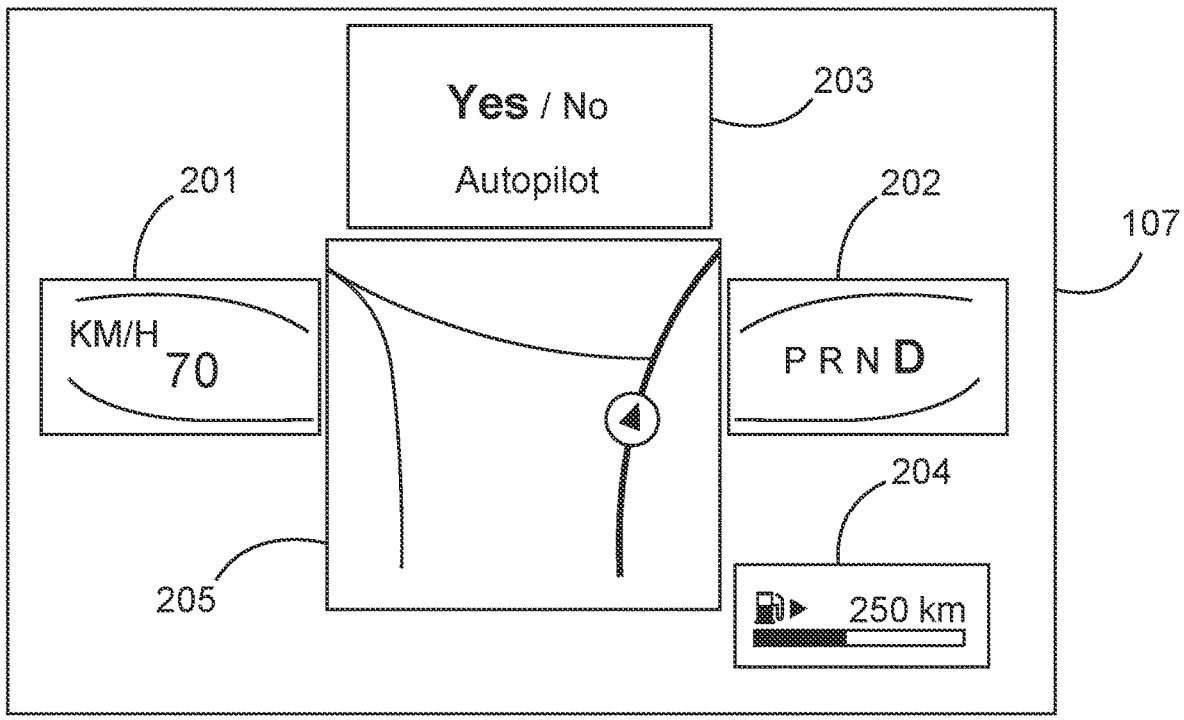
FIG. 6 is a schematic illustration of a third example of a user interface of a vehicle with the disclosed system and disclosed method.

FIG. 6 shows a schematic illustration of a third example of a user interface on a HMI unit 107 similar to FIG. 4. Whereby, here, the in the third field 203, the user interface shows an autopilot information, here that the autopilot mode of the vehicle is actually used.

Figure 7:
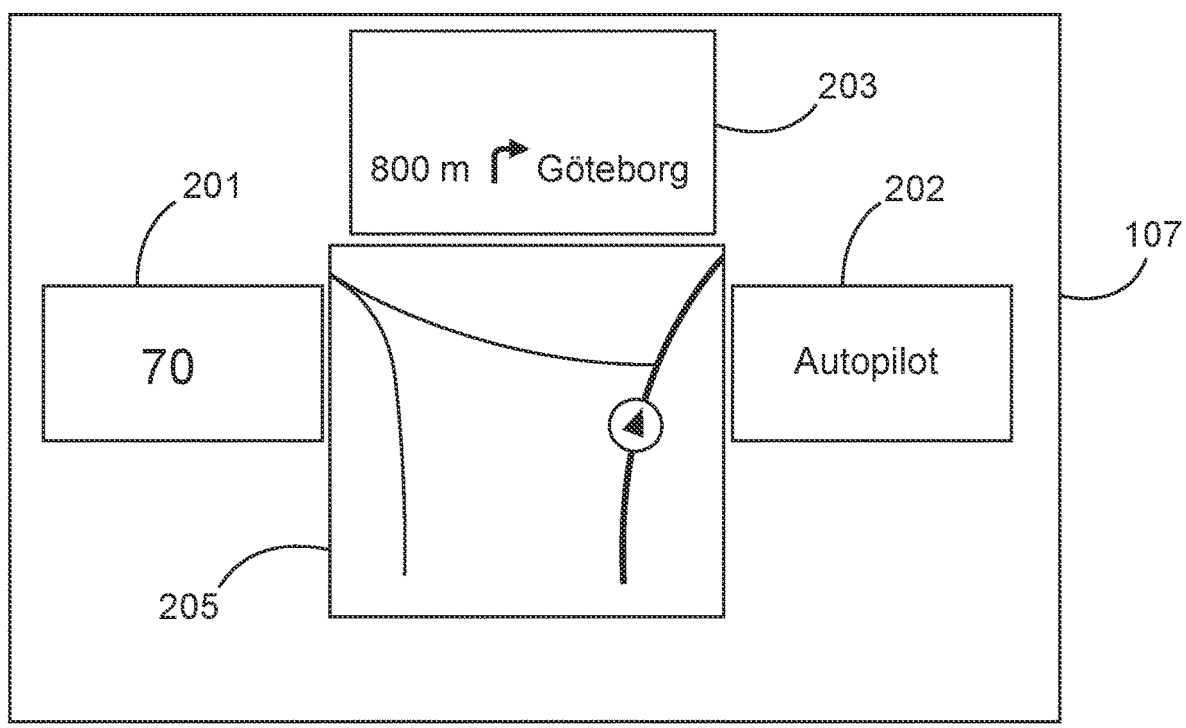
FIG. 7 is a schematic illustration of a fourth example of a user interface of a vehicle with the disclosed system and disclosed method.

FIG. 7 shows a schematic illustration of a fourth example of a user interface on a HMI unit 107 similar to FIG. 4. Whereby, in the first field 201, the user interface shows a second field view of a speed of the vehicle including the speed. As well as, in the second field 202 that the autopilot mode is activated.

In contrast to FIG. 4, the user interface in FIG. 7 does not include a fourth field 204.

Other variations to the disclosed examples can be understood and effected by those skilled in the art in practicing the claimed subject matter, from the study of the figures, the disclosure, and the appended claims. In particular, respective parts/functions of the respective example described above may also be combined with each other. In particular, the present disclosure is not limited to specific modules, vehicle functions, user interfaces, user interface areas/fields and/or communication methods. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A computer-implemented method for adjusting and customizing a user interface of a vehicle, comprising:
providing, by the vehicle, user interface data of the vehicle to a computing unit separate from the vehicle, comprising at least information about visualization parameters of at least one user interface;
providing, by the vehicle, vehicle data comprising information about vehicle parameters, wherein the vehicle data comprises at least one of a vehicle speed of the vehicle or a vehicle gear level of the vehicle;
providing, by the computing unit, user interface control data for the at least one user interface responsive to the provided user interface data, wherein the user interface control data comprises information about a selection of vehicle parameters for displaying by the at least one user interface and user interface input associated with an element of the at least one user interface;
transmitting the user interface control data to the vehicle;
adjusting, by the vehicle, the at least one user interface based on the user interface control data in real time to reconfigure a function of the element of the at least one user interface based on an availability of a specific vehicle function, as indicated by the user interface control data;
customizing, by the vehicle, the at least one user interface based on the user interface control data and at least one of the vehicle speed of the vehicle or the vehicle gear level of the vehicle in real time in order to indicate at least one of a new or updated function utilizing the element of the user interface reconfigured based on the availability of the specific vehicle function, wherein real time is defined as within a time frame having a predetermined lower limit and a predetermined upper limit, such that the at least one user interface is suitable for use in a prototyping platform;
and using the at least one user interface in the prototyping platform.

2. The method according to claim 1, wherein the vehicle data is provided by one or more vehicle bus systems comprising a Flexray bus system, Controller Area Network (CAN) bus system, Local Interconnect Network (LIN) bus system, and/or automotive Ethernet bus system.

3. The method according to claim 1, wherein the user interface is configured to process web technology comprising Hypertext Markup Language (HTML) data, Cascading Style Sheets (CSS) data, and/or JavaScript data.

4. The method according to claim 1, further comprising: providing request data and providing user interface control data further based on the request data.

5. The method according to claim 1, wherein the user interface is an augmented reality user interface of the vehicle, a head-up display interface of the vehicle and/or a cockpit display interface of the vehicle.

6. The method according to claim 1, wherein the vehicle is provided by means of a vehicle software model.

7. The method according to claim 1, wherein the method is performed as virtual reality model based on simulated vehicle data.

8. The method according to claim 1, wherein real time is defined in a timeframe of 10 milliseconds (ms) to 1000 ms.

9. The method according to claim 1, wherein the method is implemented in the vehicle and/or the computing unit.

10. The method according to claim 1, wherein the vehicle data comprises the vehicle gear level of the vehicle.

11. The method according to claim 1, wherein the vehicle data comprises the vehicle speed of the vehicle.

12. The method of claim 1, wherein the new or updated function comprises an autopilot of the vehicle, and the element of the user interface comprises a steering wheel button of the vehicle.

13. The method according to claim 1, wherein adjusting by the vehicle, the at least one user interface based on the user interface control data in real time, comprises adjusting, by the vehicle, utilizing at least one of a database or software associated with a vehicle device that may be included in a user interface setup, the at least one user interface based on the user interface control data in real time, the at least one of the database or software associated with a plurality vehicle devices that may be included in the user interface setup and indicative of user interface inputs, including the user interface input, that will activate vehicle functions, including the specific vehicle function, associated with the plurality of vehicle devices.

14. The method according to claim 1, wherein adjusting and customizing, by the vehicle, the at least one user interface based on the user interface control data in real time, comprises providing at least one of a new or updated graphical user interface via a display of the vehicle, the at least one new or updated graphical user interface including a plurality of visual elements indicating the information about the vehicle parameters included in the vehicle data and selected for display by the at least one user interface.

15. The method according to claim 14, wherein the plurality of visual elements include a first visual element indicating the vehicle speed of the vehicle.

16. The method according to claim 14, wherein the plurality of visual elements include a second visual element indicating the vehicle gear level of the vehicle.

17. A system for adjusting and customizing a user interface of a vehicle, comprising:
a first providing module of the vehicle comprising instructions stored in at least one memory and executable by one or more processors of the vehicle to cause the one or more processors to provide user interface data of the vehicle to a computing unit separate from the vehicle, the user interface data comprising at least information about visualization parameters of at least one user interface, and vehicle data comprising information about vehicle parameters, wherein the vehicle data comprises at least one of a vehicle speed of the vehicle or a vehicle gear level of the vehicle;
a second providing module of a computing unit comprising instructions stored in at least one memory and executable by one or more processors to cause the one or more processors to provide user interface control data for the at least one user interface responsive to the provided user interface data, wherein the user interface control data comprises information about a selection of vehicle parameters for displaying by the at least one user interface and user interface input associated with an element of the at least one user interface;
a transmitting module of the computing unit comprising instructions stored in at least one memory and executable by one or more processors to cause the one or more processors to transmit the user interface control data to the vehicle;

and an adjusting and customizing module of the vehicle comprising instructions stored in at least one memory and executable by one or more processors to cause the one or more processors to:
adjust the at least one user interface based on the user interface control data in real time to reconfigure a function of the element of the at least one user interface based an availability of a specific vehicle function, as indicated by the user interface control data, and customize the at least one user interface based on the user interface control data and at least one of the vehicle speed of the vehicle or the vehicle gear level of the vehicle in real time in order to indicate at least one of a new or updated function utilizing the element of the user interface reconfigured based on the availability of the specific vehicle function, wherein real time is defined as within a time frame having a predetermined lower limit and a predetermined upper limit, such that the at least one user interface is suitable for use in a prototyping platform.

18. The system according to claim 17, further comprising:
a gateway module;
a message broker module;
a custom logic module;
a remote control module;
and HMI a human machine interface (HMI) module.

19. A non-transitory computer-readable medium stored in a memory and executed by a processor to carry out computer-implemented method steps for adjusting and customizing a user interface of a vehicle, comprising:
providing, by the vehicle, user interface data of the vehicle to a separate computing unit separate from the vehicle, comprising at least information about visualization parameters of at least one user interface;
providing, by the vehicle, vehicle data comprising information about vehicle parameters, wherein the vehicle data comprises at least one of a vehicle speed of the vehicle or a vehicle gear level of the vehicle;
providing, by the computing unit, user interface control data for the at least one user interface responsive to the provided user interface data, wherein the user interface control data comprises information about a selection of vehicle parameters for displaying by the at least one user interface and user interface input associated with an element of the at least one user interface;
transmitting the user interface control data to the vehicle;
adjusting, by the vehicle, the at least one user interface based on the user interface control data in real time to reconfigure a function of the element of the at least one user interface based on an availability of a specific vehicle function, as indicated by the user interface control data;
customizing, by the vehicle, the at least one user interface based on the user interface control data and at least one of the vehicle speed of the vehicle or the vehicle gear level of the vehicle in real time in order to indicate at least one of a new or updated function utilizing the element of the user interface reconfigured based on the availability of the specific vehicle function, wherein real time is defined as within a time frame having a predetermined lower limit and a predetermined upper limit, such that the at least one user interface is suitable for use in a prototyping platform;
and using the at least one user interface in the prototyping platform.

* * * * *